(12) United States Patent
Rao et al.

(10) Patent No.: US 11,741,066 B2
(45) Date of Patent: Aug. 29, 2023

(54) BLOCKCHAIN BASED RESET FOR NEW VERSION OF AN APPLICATION

(71) Applicant: International Business Machines Corporation, Armonk, NY (US)

(72) Inventors: Siddharth R Rao, Bangalore (IN); Raghuveer Prasad Nagar, Kota (IN); Jagadesh Ramaswamy Hulugundi, Bangalore (IN); Saneesh Parambath, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 17/329,343

(22) Filed: May 25, 2021

(65) Prior Publication Data

US 2022/0382727 A1 Dec. 1, 2022

(51) Int. Cl.
*G06F 16/00* (2019.01)
*G06F 16/21* (2019.01)
*G06N 5/04* (2023.01)
*G06N 20/00* (2019.01)

(52) U.S. Cl.
CPC ............ *G06F 16/219* (2019.01); *G06N 5/04* (2013.01); *G06N 20/00* (2019.01)

(58) Field of Classification Search
CPC ......... G06F 16/219; G06N 5/04; G06N 20/00
See application file for complete search history.

(56) References Cited

U.S. PATENT DOCUMENTS

| | | | |
|---|---|---|---|
| 8,112,665 B1 | 2/2012 | Somavarapu | |
| 9,159,034 B2 * | 10/2015 | Pinckney | G09B 7/04 |
| 10,339,299 B1 * | 7/2019 | Magnuson | H04L 9/3239 |
| 10,691,528 B1 * | 6/2020 | Ferreira | G06F 11/1441 |
| 10,713,594 B2 * | 7/2020 | Szeto | G06N 20/00 |
| 11,416,754 B1 * | 8/2022 | Durvasula | G06N 3/08 |
| 11,588,705 B2 * | 2/2023 | Karri | H04L 67/131 |
| 11,636,094 B2 * | 4/2023 | Figueredo de Santana | G06F 16/1834 707/703 |
| 2009/0006493 A1 | 1/2009 | Draper | |
| 2015/0242282 A1 | 8/2015 | Gallagher | |
| 2017/0124487 A1 * | 5/2017 | Szeto | G06F 11/1448 |
| 2018/0052842 A1 * | 2/2018 | Hewavitharana | G06F 40/30 |
| 2019/0258498 A1 * | 8/2019 | Chandan | G06F 40/20 |

(Continued)

FOREIGN PATENT DOCUMENTS

EP 2051536 B1 9/2009

OTHER PUBLICATIONS

Russom, Philip, "Best Practices in Data Migration", Apr. 2006, TDWI Monograph Series, Sponsored by Informatica, The Data Integration Company, 13 pages.

*Primary Examiner* — Noosha Arjomandi

(74) *Attorney, Agent, or Firm* — David B. Woycechowsky

(57) ABSTRACT

A method for receiving an app-use contextual data set, applies artificial intelligence style machine logic to the app-use contextual data in order to generate a recommendation that the app should be subject to a recommended revision, in response to the generation of the recommended revision, makes the recommended revision in a dynamic manner, stores the app-use contextual data set in the form of a plurality of blockchain data structures, and operates around contextual reset/roll-back/restore scenarios in a hybrid cloud environment.

6 Claims, 3 Drawing Sheets

(56) References Cited

U.S. PATENT DOCUMENTS

| | | | |
|---|---|---|---|
| 2021/0096553 A1* | 4/2021 | Stump | G06Q 10/101 |
| 2021/0326315 A1* | 10/2021 | Basu | G06F 16/2228 |
| 2021/0386964 A1* | 12/2021 | Youngblood | A47C 27/085 |
| 2022/0129257 A1* | 4/2022 | Touati | G06F 16/2315 |
| 2022/0237368 A1* | 7/2022 | Tran | G06N 3/045 |
| 2022/0244847 A1* | 8/2022 | Margot | G06F 3/04886 |
| 2022/0321967 A1* | 10/2022 | Olabode | G06N 20/00 |
| 2022/0382727 A1* | 12/2022 | Rao | G06F 11/079 |

\* cited by examiner

BLOCKCHAIN BASED RESET FOR NEW VERSION OF AN APPLICATION

BACKGROUND

The present invention relates generally to the field of blockchain technology and also to the procedure for resetting an "app."

The Wikipedia entry for "Blockchain" (as of Feb. 25, 2021) states as follows: "A blockchain, originally block chain, is a growing list of records, called blocks, that are linked using cryptography. Each block contains a cryptographic hash of the previous block, a timestamp, and transaction data (generally represented as a Merkle tree). By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. The blockchain has been described as 'an open, distributed ledger that can record transactions between two parties efficiently and in a verifiable and permanent way'." (footnote(s) omitted)

The Wikipedia entry for "application software" (as of Feb. 25, 2021) states as follows: "Application software (app for short) is a program or group of programs designed for end-users. Examples of an application include a word processor, a spreadsheet, an accounting application, a web browser, an email client, a media player, a file viewer, simulators, a console game, or a photo editor. The collective noun application software refers to all applications collectively. This contrasts with system software, which is mainly involved with running the computer. Applications may be bundled with the computer and its system software or published separately and may be coded as proprietary, open-source, or projects. Apps built for mobile platforms are called mobile apps. Terminology[.] In information technology, an application (app), application program or application software is a computer program designed to help people perform an activity. Depending on the activity for which it was designed, an application can manipulate text, numbers, audio, graphics, and a combination of these elements. Some application packages focus on a single task, such as word processing; others, called integrated software include several applications. User-written software tailors systems to meet the user's specific needs. User-written software includes spreadsheet templates, word processor macros, scientific simulations, audio, graphics, and animation scripts. Even email filters are a kind of user software. Users create this software themselves and often overlook how important it is. The delineation between system software such as operating systems and application software is not exact, however, and is occasionally the object of controversy. For example, one of the key questions in the United States v. Microsoft Corp. antitrust trial was whether Microsoft's Internet Explorer web browser was part of its Windows operating system or a separable piece of application software. As another example, the GNU/Linux naming controversy is, in part, due to disagreement about the relationship between the Linux kernel and the operating systems built over this kernel. In some types of embedded systems, the application software and the operating system software may be indistinguishable to the user, as in the case of software used to control a VCR, DVD player, or microwave oven. The above definitions may exclude some applications that may exist on some computers in large organizations." (footnote(s) omitted)

While the previous paragraph gives an accurate description of many "apps," for purposes of this document, an "app" is hereby defined as any software program that performs any function on any type of computer, including, but not limited to, the types of apps described in the preceding paragraph.

As the term is used in this document "go-live" is hereby defined to mean any computer operations and/or processes where: (i) at least a portion of an enterprises data and/or software is migrated from traditional internet servers to a cloud (for example, public cloud, private cloud, hybrid cloud); (ii) the data and/or software under migration can be accessed and/or used in a substantially continuous manner during the time period of the migration; and/or (iii) "go-live" is the deployment of a functionality or business feature into a composure environment for business users.

For purposes of this document, "resetting an app" means rolling-back to an older/earlier version of functionality or feature due to development failure of the new release into a computer environment.

SUMMARY

According to an aspect of the present invention, there is a method, computer program product and/or system that performs the following operations (not necessarily in the following order): (i) receiving app-use contextual data set that includes information indicative of operations of an app and transactions statuses of an app that has been deployed and is in use; (ii) applying artificial intelligence style machine logic to the app-use contextual data in order to generate a recommendation that the app should be subject to a recommended revision; and (iii) responsive to generation of the recommended revision, making the recommended revision, in a dynamic manner.

DETAILED DESCRIPTION

Figure 1:
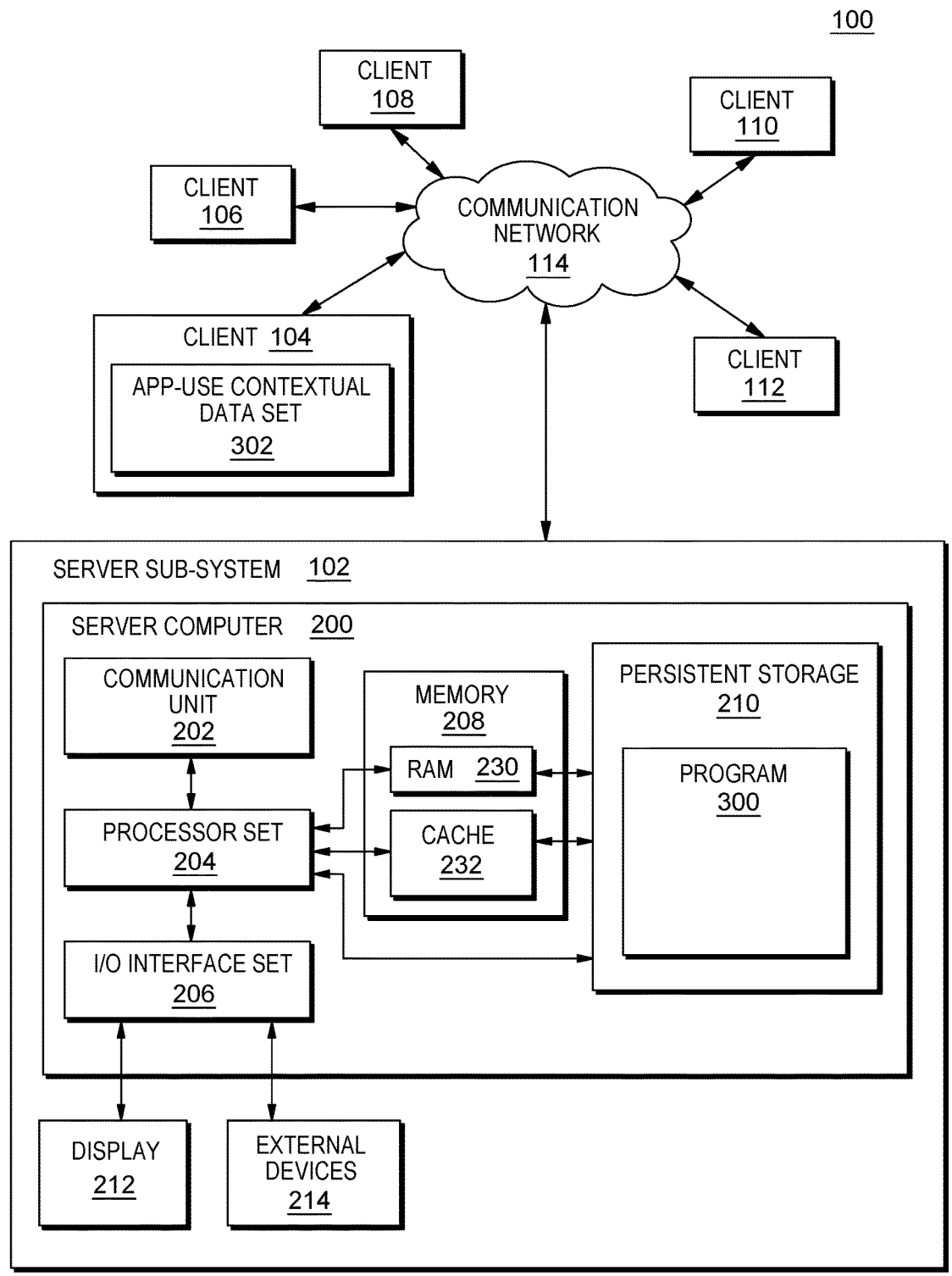
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semi-conductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; program 300; and app-use contextual data set 302.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
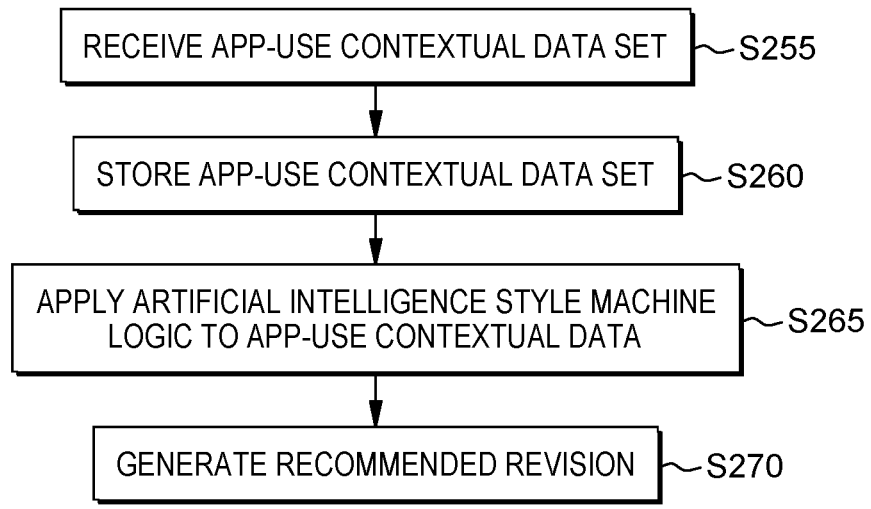
FIG. 2 is a flowchart showing a first embodiment method performed, at least in part, by the first embodiment system.
Figure 3:
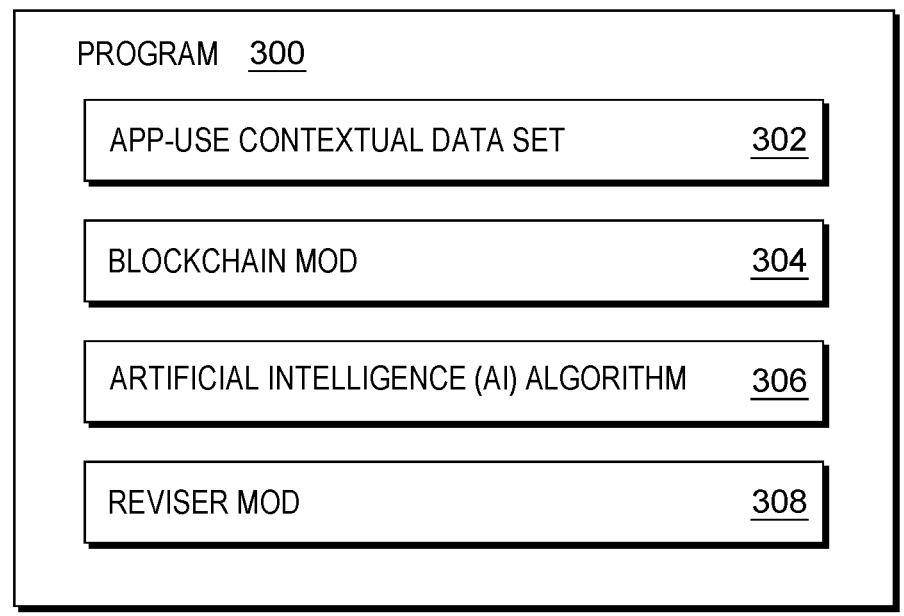
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Figure 4:
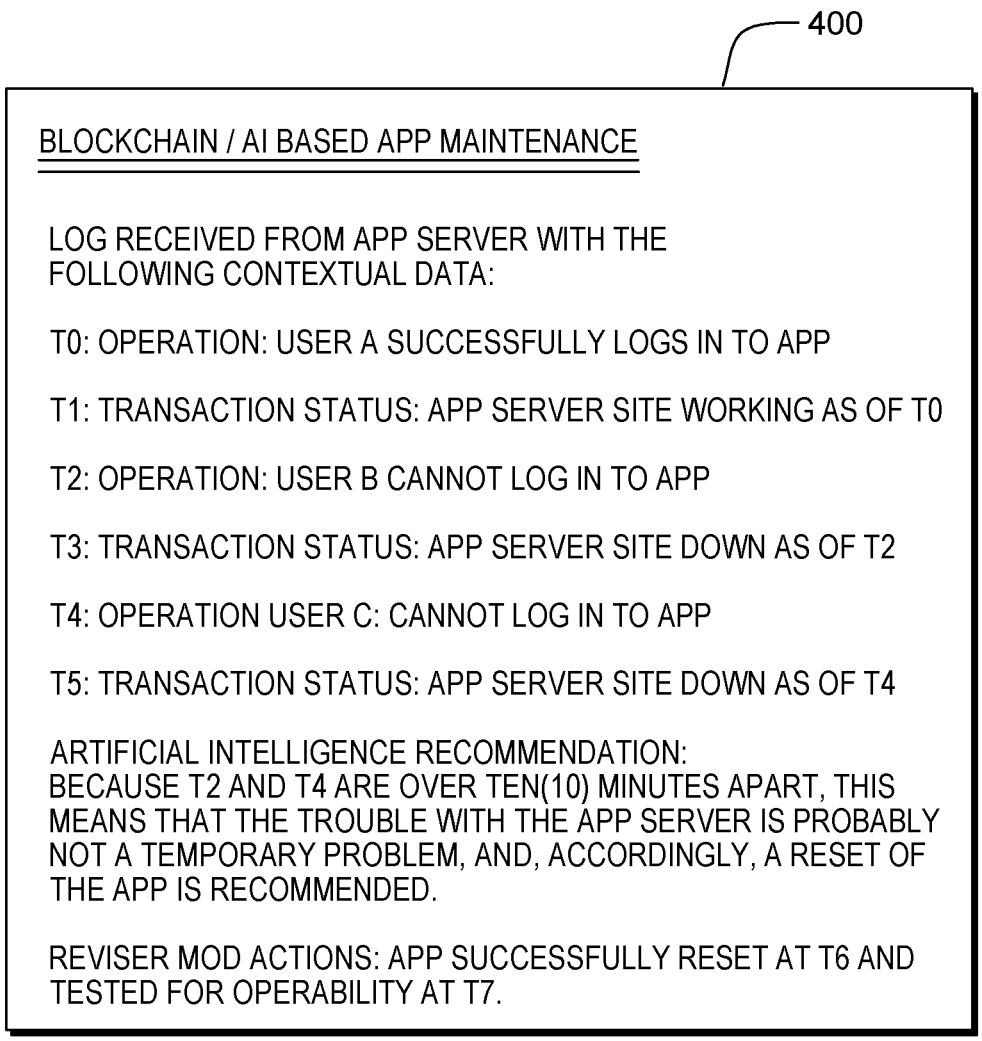
FIG. 4 is a screenshot view generated by the first embodiment system.

Processing begins at operation S255, where program 300 receives app-use contextual data set 302 from client sub-system 104. In this example, client sub-system 104 is an app server that serves codes from the app and/or output from running the app (at the server) to various users (represented here by client sub-systems 106, 108, 110 and 112). In this example, the app server of client sub-system 104 is part of a traditional client/server internet architecture. Alternatively, the app server could be located in a cloud and/or in a hybrid cloud. App-use contextual data set that includes information indicative of operations of an app and transactions statuses of an app that has been deployed and is in use. As shown in screen shot 400 of FIG. 4, the app-use contextual data set includes: (i) data for three operations (in this example, three attempted logins respectively by users A, B and C); and (ii) three transaction statuses (in this example, "APP SITE WORKING AS OF T0," "SITE DOWN," and "SITE DOWN"). The "what-if" analyzer recommends 'x' percent of sales impacted due to 'n' users impacted which is a data driven decision for stake holders to make.

This example could be extended for a user to login due to his/her internet connectivity or firewall issues. The system analyses transaction data across other users or automated jobs and recommends no reset required. Again, the "what-if" analyzer comes into the equation and impacts the data on 'y' percent of sales, but only for an intermittent window of connectivity issues. This way, a large set of users are still operational and there is no impact to the business.

Processing proceeds to operation S260, where blockchain module ("mod") 304 stores the app-use contextual data set in the form of a plurality of blockchain data structures. Information stored on the blockchain includes transaction status which represents workflow execution, with status indicators such as approved, on hold, rejected, waiting for third-party, etc. The status encompasses attributes such as status date, time, description and status audit. The transaction statuses are real-time (on-the-fly) data generated by the app throughout the day and posted on the blockchain ledger record pertaining to the transaction identifier. However, there are other data sets which could be batched once in few hours, daily, etc. as well. Data stored in the blockchain includes dynamic data which is stored real-time and when transactions occur. Static data (metadata) is stored as part of initial set up of the system as a pre-requisite. There is one blockchain per app and per enterprise. Multiple transactions can reside on the same blockchain server. However, each transaction will create a separate block with a unique identified such as a transaction ID (identifier).

Processing proceeds to operation S265, where artificial intelligence (AI) algorithm 306 applies artificial intelligence style machine logic to the app-use contextual data in order to generate a recommendation that the app should be subject to a recommended revision. In this example, the recommended revision to the app is one of the following types of revision: app reset, app roll-back and/or restore scenarios. In this example, and as shown in screen shot 400, in this example, the recommended revision is an app reset because the site is down and a reset of the app may fix this problem. Blockchain possessing is shared, secure, distributed, ordered, has write-once characteristics, and is very efficient to manage and have traceability, visibility of ownership, and related transactions during decision for a reset. This becomes vital during deployment failure scenarios when transaction anomalies, due to the varied nature of transaction states and their stored data structures occur. Contextual reset requires data sets to be considered across the enterprise from multiple applications at any point of time for a reset decision. The traceability should be of the highest quality based on ground reality and utmost truth. This true data is harnessed by the AI system to leverage the blockchain to assess, predict, and recommend a reset solution. It is noted that traditional systems typically have limitations, such as anomaly transaction data or jeopardized data, that could be tampered with or reversed due to the nature of recommended reset decisions, which will not be accurate and thereby cause undesirable effects.

Processing proceeds to operation S270, where, responsive to generation of the recommended revision, reviser mod 308 makes the recommended revision, in a dynamic manner. In this case, dynamic implies a contextual situation handling based on transaction data analysis. This could be based on a set, pre-defined frequency, or by an automatic method of machine learned frequency being performed: (i) automatically, upon traversing the data features at a machine learned specified time or machine learned state, using machine execution of the transaction; and/or (ii) using an explicit request by a user to get the recommendation for the current context and situation.

As discussed in connection with operation S270, and as shown in screen shot 400, the app reset has been made and a diagnostic test associated with resetting the app has made sure that the app is working again.

III. Further Comments and/or Embodiments

IT (information technology) teams have commercially available log analysis frameworks such as operations analytics, third party proprietary tools, or open source tools. These tools enable the system to understand transaction type, category, sequence, date time, etc., and leverage any of the NLP (neuro-linguistic programming) techniques based machine learning enabling arts to classify transactions, based on log file entries into feature types such as functional, technical or security.

Some embodiments of the present invention recognize the following facts, potential problems and/or potential areas for improvement with respect to the current state of the art: (i) go-live of a large IT application is a major milestone for any business transformation journey; (ii) once incepted, applications take small little steps and start offering enhanced features and functionalities, facilitating and enabling multiple stake holders who are using the application to perform their activities more efficiently; (iii) considering the importance of go-live, IT and business teams spend a lot of time making things go right in the first place; and/or (iv) during go-live, most teams have checklists, process maps, tools, and managerial checkpoints, yet the gaps and loopholes bubble up primarily because of inadequate planning, weak governance models, technical limitations, and oversight errors due to missing finer details, manual mistakes, poor infrastructure allocation, understaffing, etc.

Some embodiments of the present invention recognize the following facts, potential problems and/or potential areas for improvement with respect to the current state of the art: (i) due to varied factors influencing a go-no-go decision attributed to business pressure or financial commitment to internal or external stake holders, unfavorable decisions of go-live are done though systems that are not ready yet, which puts the whole enterprise under jeopardy, and at the mercy of fate, leading to very high risk with the potential of bankruptcy and/or shutdown; and/or (ii) to salvage the above described situation, most businesses fall back to an option of restore or reset which is arguably based on some date or cut off window, however this creates a transaction anomaly due to the varied nature of transaction states and their stored data structures.

Some embodiments of the present invention recognize the following facts, potential problems and/or potential areas for improvement with respect to the current state of the art: (i) leads to a situation when reset is: (a) not required for certain transactions, (b) partially required for selected transactions, and/or (c) needs a complete reversal for some transactions; (ii) there is no way for IT or business personnel to implement the need for resets, given that resets are always driven out of a date window with which the financial impact on the business will be large and compromised; (iii) a go/no-go essentially becomes a binary decision with no middle path, based on the actual situation being faced during go-live; and/or (iv) what is needed is a way for businesses to realize new dynamic ways of reset management, unlike traditional ways of resetting by date ranges.

Some embodiments of the present invention may include one, or more, of the following operations, features, characteristics and/or advantages: (i) uses AI (artificial intelligence) and blockchain type machine logic (for example, software) to recommend dynamic reset, restore, and rollback options for an IT application on transaction data; (ii) considers the contextual understanding of transaction states and data; (iii) operates around contextual reset/roll-back/restore scenarios in a hybrid cloud environment; (iv) enables go-live (that is, becomes operational) for IT applications; and/or (v) includes seamless fitment of various embodiments with respect to a hybrid cloud strategy for IT scenarios involving movement of applications from on-premises software (from any platform) to cloud migration (to any platform).

Some embodiments of the present invention may include one, or more, of the following operations, features, characteristics and/or advantages: (i) uses AI and blockchain type machine logic to learn the context of data exchange on a live interface in order to classify interface data elements in a manner that: (a) is based on real usage, (b) recommends notation algorithms for enhancing application and interface-infrastructure performance, and/or (c) applies the generated recommendations, including interface-documentation updates; (ii) includes go-live (not necessarily an upgrade) which requires contextual reset/roll-back/restore recommendation strategies in a hybrid cloud environment, unlike traditional methods of complete roll-back/reset, which will impact enterprises with a huge monetary impact; and/or (iii) includes roll-back/reset/restore situations which are common and applicable during any go-live situation of software rollout.

Some embodiments of the present invention may include one, or more, of the following operations, features, characteristics and/or advantages: (i) includes specific details in which some embodiments of the present invention determines a method for a blockchain based contextual reset manager for the replacement/upgrade of an IT application; (ii) includes operations for having a machine learning based system to recommend the dynamic reset, restore, and rollback options for an IT application, on transaction data, which considers the contextual understanding of the transaction states and data; (iii) includes an operation for: (a) predicting the life cycle of identified transactions enabled with a "what-if" analyzer, and/or (b) determines the transaction end state towards jeopardy (unexpected as per design) or a happy path (expected as per design), (for example, this aides business stake holders to make the right decisions with confidence and conviction of the derived rollback/restore/reset strategy); and/or (iv) includes an operation for deriving and enabling a hybrid system (within an enterprise architecture) with context-based work/data processing, where the hybrid system consists of both old and new IT applications.

Some embodiments of the present invention may include one, or more, of the following operations, features, characteristics and/or advantages: (i) is in line with a focus on data, contextual and machine learning, and blockchain; (ii) is aligned with a hybrid cloud strategy for IT scenarios involving movement of applications from on-premises software (or from any platform) to cloud migration (to any platform); (iii) seamlessly provides a big advantage for cloud companies against other private and public cloud providers; (iv) includes a license value against multiple software and service offering providers; (v) can be modeled as an individual stream of SaaS (software as a service) offering and revenue recognition channel for multiple products; and/or (vi) includes big potential opportunities for business industries across manufacturing, retail, telecommunication, banking, hospitality, insurance, etc.

Some embodiments of the present invention may include one, or more, of the following operations, features, characteristics and/or advantages: (i) offers huge non-functional value-add for business financials by considering how expensive reset, restore and roll-back operations are; (ii) enhances and enables successful go-live for IT applications; (iii) includes a large advantage for IT and business personnel who are in a dilemma about a recent decision that was made without knowing the repercussions; and/or (iv) decision making authorities, who are enabled with a data driven analysis objective, can make decisions with conviction by eliminating any apprehensions, which is a big value-add for personas and stake holders in the enterprise.

Some embodiments of the present invention may include one, or more, of the following operations, features, characteristics and/or advantages: (i) the algorithm is a boot strap aggregation (normally called bagging or ensemble methodology) technique which combines the predictions from multiple machine learning algorithms together to make more accurate predictions than any individual model; (ii) reduces the variance for algorithms that have high variance; (iii) data features are from a large array of sources with variety and inter-dependence, changing with respect to the context of the transaction, (that is, there is a need for multiple models such as classification, linear regression and decision trees to be used); and/or (iv) bagging of algorithms is used to achieve the solution.

Some embodiments of the present invention may include one, or more, of the following operations, features, characteristics and/or advantages: (i) the insights generated are wired and painted on a GUI (graphical user interface) application for business users to envisage the analytical data along with the rationale, as recommended by the system; (ii) sample bagging of algorithm usage for the data features includes: (a) a decision tree used to segregate data security buckets such as public, private, and confidential, and/or (b)

logistic regression is used for classification such as test case "passed" or "failed"; and/or (iii) multi-linear regression is used for predicting one continuous variable over multiple independent variables, such as transaction predicted towards jeopardy based on log analysis, error codes and historical business audits.

Some embodiments of the present invention may include one, or more, of the following operations, features, characteristics and/or advantages where the system and method determines the transaction context through various data sources such as, but are not limited to: (i) logs, log analyzer, heap or thread dumps, memory, CPU (central processing unit) utilization, and network address translators; (ii) error codes during failures (for example, error descriptions from a stack trace), (iii) reason codes, notes, and/or instructions used on business documents by personnel; (iv) transactions breaching business thresholds and tolerances; (v) application software hardware sizing constraints on memory, CPU, and/or storage; (vi) long running backend processes which are extended beyond stipulated time; (vii) concurrent business users at any given time of the business day; (viii) historical behavior of applications with respect to specific transactions in the system; and/or (ix) jeopardy management policies enforced by the enterprise.

In addition, the transaction context will be determined by the system using the below parameters (sample criteria list): (i) error codes during failures and error descriptions from the stack trace will be learned by the system, leveraging commercially available natural language classifier software to classify transactions based on log file entries and for the context derivation; (ii) reason codes, notes, and instructions used on business documents by personnel will be available to the system through a business audit engine and this will be realized through commercially available natural language classifier software; (iii) transactions, breaching business thresholds and tolerances hardware sizing constraints will be available to the system through health monitors, memory, CPU utilization, and memory-heap (RAM) tools on any OS (operating system) hosted platform; (iv) application software and hardware sizing constraints on memory, CPU, and storage; (v) long running backend processes which are extended beyond stipulated time through process profiles generated at an OS level, database explain plans, and session objects; (vi) concurrent business users, at any given time of the business day, are made available through a number of user active connections to the system; (vii) historical behavior of the application, with respect to a specific transaction in the system, is the knowledge corpus available for the idea encompassing incidents and their respective actions (one or multiple or a combination of actions is possible); and/or (viii) jeopardy management policies enforced by the enterprise is the knowledge corpus available for encompassing what jeopardy incidents occurred and was the resolution in-line with business policies. For example, the archival and backup was not being done real-time by the enterprise. This impacted and put in jeopardy the recovery time objective (RTO) and recovery point objective (RPO) metrics. In context of what was later achieved, both the RPO and RTO metrics were not well controlled.

In addition, according to some embodiments of the present invention, data sources and availability could be in the form of: (i) structured database reports; (ii) semi-structured spreadsheet files; and/or (iii) unstructured raw data which will be parsed for content by commercially available software.

Some embodiments of the present invention may include one, or more, of the following operations, features, characteristics and/or advantages: (i) includes a machine learning based system and method to recommend the dynamic reset, restore, and roll-back options, for an IT application on transaction data, considering the contextual understanding of transaction states and data; (ii) includes a system and method to: (a) predict the life cycle of identified transactions enabled with a "what-if" analyzer, and/or (b) determine the transaction end state towards jeopardy (unexpected as per design) or a happy path (expected as per design): (iii) aids business stake holders to make the right decision with confidence and conviction of the derived rollback/restore/reset strategy; and/or (iv) includes a system and method to derive and enable a hybrid system (within an enterprise architecture) with context based work/data processing, where the hybrid system consist of both old and new IT applications.

According to embodiments of the present invention, sample data features for leveraging the "what-if" analyzer example described in the two (2) above paragraph will now be further described. This applies (for example, to 60 retail stores) and includes: (i) a knowledge corpus of the individual store's order fulfillment verses the order cancel ratio; (ii) a knowledge corpus of jeopardies that occurred when the store was notified about fulfillment of orders that were delayed, cancelled, and/or backordered; (iii) a knowledge corpus of the individual store's demography (for example, sales, revenue, margin, footfalls, etc.) for handling transactions at the point of sale, or by backroom operations, including inbound/outbound inventory management; (iv) metadata of enterprise customers, enterprise product catalog (departments), and business lines; and/or (v) metadata of individual store's personnel skills, operational capacity in hours (per each day/shift), and location, as in metro/non-metro.

Some embodiments of the present invention may include one, or more, of the following operations, features, characteristics and/or advantages: (i) businesses sign up for the service involves metadata, transaction data, and/or workflow nomenclature from their enterprise applications across multiple IT applications; (ii) the system gets automatically triggered based on: (a) traversing data features at a machine learned specified time, (b) machine learned state; and/or (c) machine execution of the transaction; (iii) the system gets automatically triggered based on an explicit request by a user to get the recommendation for the current context and situation; (iv) the system encompasses data from multiple enterprise applications as part of go-live functionality including: (a) interface details as in XSD's (XML (extensible markup language) schema definitions), (b) interface types such as async, sync, rest, message-oriented middleware, etc., (c) designed data models on individual applications as a DB (database) object view, (d) test plans and test execution results, (e) production data of the application in consideration for go-live, (f) data categories such as public, private, classified and confidential, (g) source code business logic interpretation as in a function point analyzer, (h) state machine transaction context and designed workflows including task, sub-task, status, urgency or priority, and/or (i) metadata demography (for example, (1) departments and merchandise they sell, (2) stores and their regular footfalls, and/or (3) store orders by day, average, peak, customer segments, loyalty, and brand affinity).

Some embodiments of the present invention may include one, or more, of the following operations, features, characteristics and/or advantages: (i) all the data is diversified; (ii) all the data comes from disparate sources (for example, from several applications including third party, partner applications); (iii) all the data is stored on blockchain ledger(s); (iv) the use of blockchain ledger technology entrusts that the data integrity trust is at the highest level; (v) leverages machine learning algorithms to provide a "what-if" analyzer to traverse the data; (vi) the "what-if" analyzer predicts jeopardy with the transaction data or, alternatively, a successful path journey flow of transaction data; (vii) the prediction models are based on a relationship with migrated data in the current state, along with the future impact on upstream and downstream data exchange; (viii) leverages bagging algorithms which encompasses multiple machine learning (ML) models; (ix) ML models are combined together for enhanced accuracy; (x) can accommodate a large varied set of dependent attributes playing a role in predicted jeopardy or happy path flows; (xi) the insights generated are communicated to and displayed by a GUI application; and/or (xii) uses GUI applications, with insights, for business users to envisage the analytical data, along with rationale as recommended by the system.

Some embodiments of the present invention may include one, or more, of the following operations, features, characteristics and/or advantages: (i) determines affected data; (ii) cleans data; (iii) recommends a system and method based around identifying roll back data sets in a dynamic fashion; (iv) facilitates decision making insights for business or IT stake-holders about the initial baseline data set, or the modified data set, to dynamically determine and recommend the successful journey paths or jeopardy paths with the current and/or future context of transactions; (v) considers the contextual understanding of transaction states and data; (vi) includes a "what-if" analyzer that determines the transaction end state as being either: (a) susceptible to the danger of having loss of data (for example, unexpected data loss as per design), or (b) a reliable path not likely to cause data loss (for example, data flows as expected as per design); and/or (vii) aids business stake holders to make the right decisions with confidence and conviction of the derived rollback/restore/reset strategy that may be recommended by a computer system that is an embodiment of the present invention.

Some embodiments of the present invention may include one, or more, of the following operations, features, characteristics and/or advantages and are consider to be implementation details: (i) the system derives the recommendation for rollback workflow by analyzing the transaction data at an individual entity level (for example, departments, product lines, item categories, cart, sales orders, transfer order, work orders, purchase orders, etc.); (ii) with data points and system predictions, the business and IT leadership make decisions to start accepting live traffic for new orders (for example, for selected 60 retail stores out of 100 retail stores) which take orders from customers where the store names are shortlisted and also recommended by the system; (iii) the stakeholders have a hybrid path solution which can keep the business moving on all wheels; and/or (iv) all the stores across the fulfillment network can take orders, however they consume inventory from stores which are on the new lightening application.

Some embodiments of the present invention may include one, or more, of the following operations, features, characteristics and/or advantages: (i) transaction status represents workflow execution with a status such as approved, on hold, rejected, waiting for third-party, etc.; (ii) the status encompasses attributes such as status date, time, description, and status audit; (iii) the transaction statuses are real-time "on-the-fly" data generated by the app throughout the day and posted on a blockchain ledger record pertaining to the transaction identifier; and/or (iv) there are other data sets which could be batched once in few hours, daily, etc. as well.

Some embodiments of the present invention may include one, or more, of the following operations, features, characteristics and/or advantages: (i) the system encompasses data from multiple enterprise applications as part of "go-live" functionality; (ii) data is diversified, comes from disparate sources, comes from several applications (including third party and partner applications), is stored on blockchain that includes: (a) interface details as in XSDs (XML schema definitions), (b) interface types (for example, async, sync, rest, message-oriented middleware products, etc.), (c) designed data models on individual applications as a DB object view, (d) test plans, (e) test execution results, (f) production data of transactions executed on the application in consideration for "go-live", (g) data categories such as public, private, classified, and confidential, (h) source code business logic interpretation as in function point analyzer, (i) state machine transaction context and designed workflows including task, sub-task, status, urgency, or priority, and/or (j) metadata demography (for example, departments and merchandise they sell, stores and their regular footfalls, store orders on daily/average/peak basis, customer segments, loyalty, and/or business brand affinity); (iii) points (f), (g), (i), and (j) above will generate "on-the-fly" data from the app as operations are performed where the rest of the points will have one-time data set up at the start; (iv) one blockchain record, with multiple blocks, get added for every transaction executed on the app and is primarily driven by points (f) and (i) above; and/or (v) all blocks are linked via a unique transaction identifier (key).

Some embodiments of the present invention may include one, or more, of the following operations, features, characteristics and/or advantages: (i) there is one blockchain per app, per enterprise; (ii) transaction status is the same as workflow status; and/or (iii) the number of different apps typically involved in a single workflow instance is very subjective and is based on: (a) the industry, (b) workflow complexity, (c) the number of enterprise business lines, (d) the operational span across geographies; and/or (e) there are 'n' number of apps managing a workflow.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code;

(iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
receiving app-use contextual data set that includes information indicative of operations of an app and transactions statuses of an app that has been deployed and is in use;
applying artificial intelligence machine logic to the app-use contextual data in order to generate a recommendation that the app is to be rolled back to a previous version, with the application of artificial intelligence machine logic including performing ensemble methodology by applying a plurality of machine learning algorithms to the app-use contextual data set; and
responsive to generation of the recommended revision, rolling back the app to the previous version;
wherein the to the application of the artificial intelligence style machine logic includes:
application of at least one classification model to the app-use contextual data set;
application of at least one linear regression model to predict a continuous function of a dependent variable with respect to an independent variable; and
application of a decision tree to segregate data security categories.

2. The CIM of claim 1 wherein the app-use contextual data set includes information indicative of operation of the app from at least the following sources: logs, log analyzer, heap or thread dumps, memory, CPU (central processing unit) utilization.

3. The CIM of claim 1 wherein the app-use contextual data set includes information indicative of operation of the app from at least the following sources: error codes and error descriptions from a stack trace.

4. The CIM of claim 1 wherein the app-use contextual data set includes information indicative of operation of the app from at least the following sources: reason codes, notes, and instructions used on business documents by personnel.

5. The CIM of claim 1 wherein the app-use contextual data set includes information indicative of operation of the app from at least the following sources: application software hardware sizing constraints on memory, CPU and storage.

6. The CIM of claim 1 wherein the app-use contextual data set includes information indicative of operation of the app from at least the following sources: long running backend processes which are extended beyond stipulated time, concurrent business users at any given time of the business day, historical behavior of applications with respect to specific transactions in the system, and jeopardy management policies enforced by the enterprise.

* * * * *